US012633048B2

(12) United States Patent
Ouchi

(10) Patent No.: US 12,633,048 B2
(45) Date of Patent: May 19, 2026

(54) INFORMATION PROCESSING APPARATUS, INFORMATION PROCESSING METHOD, AND NON-TRANSITORY COMPUTER READABLE MEDIUM

(71) Applicant: CANON KABUSHIKI KAISHA, Tokyo (JP)

(72) Inventor: Kenji Ouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 18/417,050

(22) Filed: Jan. 19, 2024

(65) Prior Publication Data
US 2024/0257450 A1 Aug. 1, 2024

(30) Foreign Application Priority Data

Feb. 1, 2023 (JP) ................................. 2023-013757

(51) Int. Cl.
| | |
|---|---|
| *G06T 3/40* | (2024.01) |
| *G06T 17/00* | (2006.01) |
| *G06V 10/54* | (2022.01) |
| *G06V 10/60* | (2022.01) |

(52) U.S. Cl.
CPC ................ *G06T 17/00* (2013.01); *G06T 3/40* (2013.01); *G06V 10/54* (2022.01); *G06V 10/60* (2022.01)

(58) Field of Classification Search
CPC ...... G06V 10/60; G06V 10/54; G06T 19/006; G06T 3/40; G06T 17/00; G06F 3/011
See application file for complete search history.

(56) References Cited

U.S. PATENT DOCUMENTS

| | | | | |
|---|---|---|---|---|
| 10,447,937 | B2 | 10/2019 | Ouchi | |
| 2019/0272676 | A1* | 9/2019 | Finn | G06F 30/20 |
| 2020/0019755 | A1* | 1/2020 | Hanai | G06T 19/006 |
| 2021/0035533 | A1 | 2/2021 | Tanaka | |
| 2021/0166661 | A1* | 6/2021 | Wakabayashi | G09G 5/38 |
| 2023/0005166 | A1* | 1/2023 | Germer | G01B 11/22 |
| 2023/0237730 | A1* | 7/2023 | Seiler | G06F 3/013 |
| | | | | 345/441 |
| 2023/0315247 | A1* | 10/2023 | Pastrana | G06F 1/1694 |
| | | | | 715/716 |
| 2024/0104866 | A1 | 3/2024 | Ouchi | |

FOREIGN PATENT DOCUMENTS

JP 2021-021889 A 2/2021

* cited by examiner

*Primary Examiner* — Phi Hoang
(74) *Attorney, Agent, or Firm* — Venable LLP

(57) ABSTRACT

An information processing apparatus according to the present invention includes at least one memory and at least one processor which function as: an acquisition unit configured to acquire a display condition for a graphic to be displayed in three-dimensional space; an analyzing unit configured to analyze the three-dimensional space; and a determining unit configured to determine a display position of the graphic in the three-dimensional space, on a basis of the display condition of the graphic and an analysis result of the three-dimensional space, wherein the display condition is associated with the graphic, and includes a condition relating to the three-dimensional space.

13 Claims, 5 Drawing Sheets

INFORMATION PROCESSING APPARATUS, INFORMATION PROCESSING METHOD, AND NON-TRANSITORY COMPUTER READABLE MEDIUM

BACKGROUND OF THE INVENTION

Field of the Invention

The present invention relates to an information processing apparatus, an information processing method, and a non-transitory computer-readable medium, and relates to technology for displaying graphics (computer graphics (CG)) in three-dimensional space.

Description of the Related Art

In recent years, sensory video contents using technology called extended reality (XR) are gaining attention as CG rendering technology develops and mobile equipment (e.g., smartphones and head-mounted displays) come into widespread use. XR is a general term for image-processing technology for creating space in which the real world and virtual worlds are integrated, and virtual experiences are provided. XR includes, for example, virtual reality (VR), augmented reality (AR), and mixed reality (MR).

XR coming into widespread use has paved the way for an environment in which users can display and view CGs in their preferred virtual spaces or real space. As of recent, digital art associated with non-fungible tokens (NFTs), known as NFT art, is gathering attention, and there is demand for the ability for individuals to easily construct an environment for viewing CGs such as digital art.

When viewing CGs, the CGs may be difficult to visually recognize depending on the background. Correcting the CGs would improve visual recognizability thereof. However, correcting CGs would diminish the intent of the creator of the CG, and accordingly CGs (particularly works of art) should not be corrected. Japanese Patent Application Publication No. 2021-021889 discloses technology for improving visual recognizability of objects in a relative manner, by lowering the visual recognizability of the background thereof.

However, the background is changed (the visual recognizability of the background is reduced) in the technology disclosed in Japanese Patent Application Publication No. 2021-021889, and accordingly users may not be able to view CGs with their desired backgrounds. Further, changing the background may change the impression of the CGs (the intent of the creator of the CG may be diminished).

SUMMARY OF THE INVENTION

The present invention provides technology that enables a CG to be viewed in a state that is in agreement with the intent of the creator of the CG.

The present invention in its first aspect provides an information processing apparatus including at least one memory and at least one processor which function as: an acquisition unit configured to acquire a display condition for a graphic to be displayed in three-dimensional space; an analyzing unit configured to analyze the three-dimensional space; and a determining unit configured to determine a display position of the graphic in the three-dimensional space, on a basis of the display condition of the graphic and an analysis result of the three-dimensional space, wherein the display condition is associated with the graphic, and includes a condition relating to the three-dimensional space.

The present invention in its second aspect provides an information processing apparatus including at least one memory and at least one processor which function as: a determining unit configured to determine a candidate for a display position for a graphic in a three-dimensional space; and a display control unit configured to perform control to identifiably display the candidate in the three-dimensional space, wherein a candidate determined by the determining unit differs between a case of a first graphic, and a case of a second graphic that differs from the first graphic.

The present invention in its third aspect provides an information processing method including: acquiring a display condition for a graphic to be displayed in three-dimensional space; analyzing the three-dimensional space; and determining a display position of the graphic in the three-dimensional space, on a basis of the display condition of the graphic and an analysis result of the three-dimensional space, wherein the display condition is associated with the graphic, and includes a condition relating to the three-dimensional space.

The present invention in its fourth aspect provides a non-transitory computer readable medium that stores a program, wherein the program causes a computer to execute an information processing method including: acquiring a display condition for a graphic to be displayed in three-dimensional space; analyzing the three-dimensional space; and determining a display position of the graphic in the three-dimensional space, on a basis of the display condition of the graphic and an analysis result of the three-dimensional space, wherein the display condition is associated with the graphic, and includes a condition relating to the three-dimensional space.

Further features of the present invention will become apparent from the following description of exemplary embodiments with reference to the attached drawings.

DESCRIPTION OF THE EMBODIMENTS

Embodiments for carrying out the present invention will be described below in detail. Note that the embodiments described below are examples of realizing the present invention, and should be modified or changed as appropriate in accordance with configurations of apparatuses to which the present invention is applied and various types of conditions, and the present invention is not limited to the following embodiments. Configurations obtained by appropriately combining the embodiments that will be described later are also encompassed by the present invention.

Figure 1:
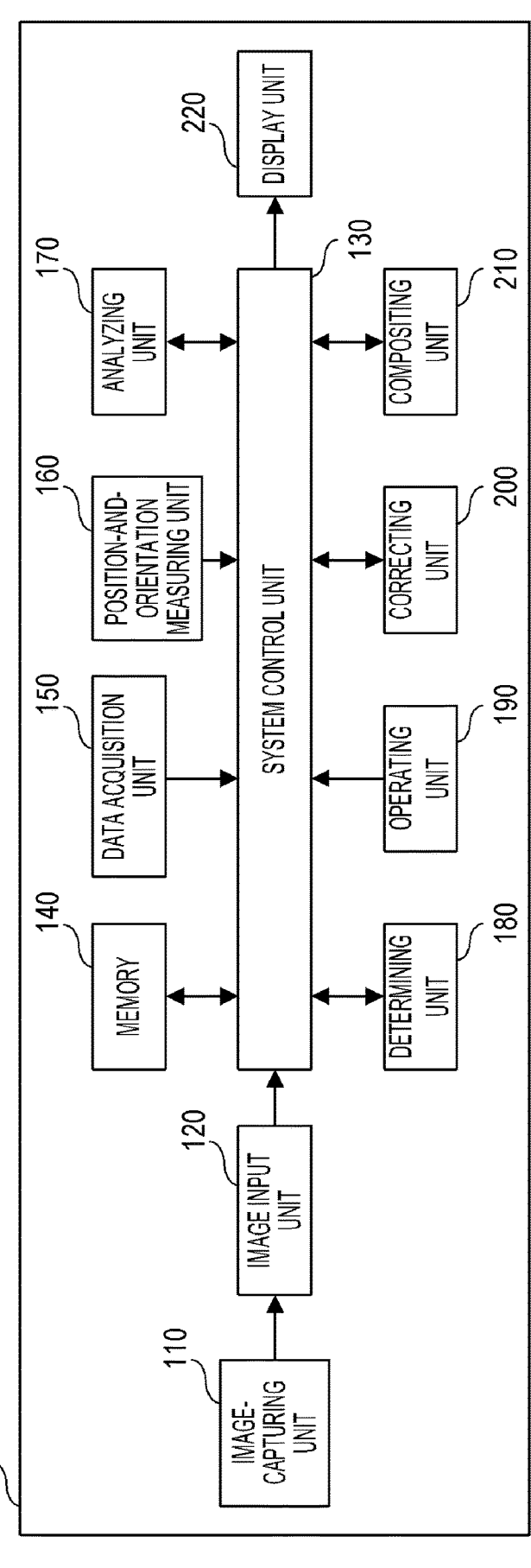
FIG. 1 is a block diagram illustrating a configuration example of an information processing apparatus.

FIG. 1 is a block diagram illustrating a configuration of an information processing apparatus 100 according to the present embodiment. The information processing apparatus 100 is an apparatus that is capable of providing an extended reality (XR) environment, and is a head-mounted-type display device, such as for example, a head-mounted display (HMD), smart glasses, or the like. Note that the present invention is not limited to a head-mounted-type display device, and is applicable to various types of devices such as smartphones, tablet terminals, and so forth. The present invention is also applicable to devices (e.g., personal computers or controllers) that can be controlled to display images on external devices (e.g., head-mounted-type display devices, smartphones, or tablet terminals).

An XR environment is an environment (three-dimensional space) to which technology called XR, for example, is applied. XR is a general term for image-processing technology for creating space in which the real world and virtual worlds are integrated, and virtual experiences are provided. XR includes, for example, virtual reality (VR), augmented reality (AR), and mixed reality (MR).

VR is a technology for providing users with video of virtual space. For example, just video of a virtual space is presented to a user who is wearing an HMD and of which visual recognition of real space is blocked. Thus, the user can be provided with video contents with a high level of sense of immersion.

AR is a technology for presenting users with graphics (computer graphics (CG)) of which real space is the background. For example, an image of real space (background image) is displayed on a smartphone or HMD, and two-dimensional or three-dimensional CGs are displayed in a state where they are overlaid (composited) on the background image (video see-through). Alternatively, real space may be directly visually recognized without displaying images of real space (optical see-through). According to AR, the user can be provided with highly-realistic video contents in which virtual objects are present in real space.

MR is a technology for presenting users (users of smartphones or HMDs, for example) with a world in which the real world is reflected in a virtual world (MR space). In MR, the user can approach virtual objects, and perform various types of operations with a sensation close to that of touching the virtual objects, and so forth. Further, a plurality of users can experience the same MR space in real time (at the same time).

An image-capturing unit 110 is a camera that performs image-capturing of real space in real time. The image-capturing unit 110 may include one camera, or may include a plurality of cameras. The image-capturing unit 110 may perform image-capturing of just a region that corresponds to a field of view of the user, or may perform image-capturing of a region including the region that corresponds to the field of view of the user and a region outside of that region (a region not corresponding to the field of view of the user). The region that corresponds to the field of view of the user can be understood as being a region in a direction of the face of the user.

A system control unit 130 controls the entire information processing apparatus 100. For example, the system control unit 130 acquires images (videos) of real space image-captured by the image-capturing unit 110, via an image input unit 120, and performs storage (saving) thereof in memory 140.

A data acquisition unit 150 acquires CGs, and performs storage thereof in the memory 140. For example, the data acquisition unit 150 acquires CGs via a network, acquires CGs from a storage device connected to the information processing apparatus 100, and so forth. The information processing apparatus 100 may have a storage unit that is omitted from illustration, and the data acquisition unit 150 may acquire CGs from this storage unit. The CGs may be digital art such as non-fungible token (NFT) art, may be two-dimensional graphics (planar graphics), or may be three-dimensional graphics (stereoscopic graphics).

The data acquisition unit 150 further acquires settings information associated with the CGs, and performs storage thereof in the memory 140. The settings information may be metadata added to image data of the CGs, or may be data that is separate from the image data of the CGs (e.g., information registered in advance as NFT data). The settings information may be data that is stored in the information processing apparatus 100 (e.g., in a storage unit that is omitted from illustration), or may be data that is stored in an external device. The settings information may be acquired via a network.

The settings information includes display conditions of CGs. The display conditions include, for example, a display size of a CG and one or more recommendation values. The one or more recommendation values include at least one of a recommendation value of brightness of the background, a recommendation value of tint (shade) of the background, a recommendation value of white balance of the background, a recommendation value of resolution of the background, and a recommendation value of texture of the background.

Description will be made regarding the background. For example, in a case in which the information processing apparatus 100 operates in AR mode (video see-through), an image of real space that is image-captured by the image-capturing unit 110 is displayed on a display unit 220 as the background (background image). In a case in which the information processing apparatus 100 operates in VR mode, there is no need for the image-capturing unit 110 to perform image-capturing of real space, and an image of the virtual space is used as the background (background image). The image of the virtual space is acquired via a network by the data acquisition unit 150, for example. In a case of optical see-through, real space is directly visually recognized, and accordingly no background image is displayed on the display unit 220.

A position-and-orientation measuring unit 160 measures the position and orientation of the information processing apparatus 100 (image-capturing unit 110) in real space, and stores measurement results in the memory 140. A known measurement device that measures three-dimensional position and orientation using various types of sensors is used as the position-and-orientation measuring unit 160, for example. The sensors used by the position-and-orientation measuring unit 160 include at least one of gyro sensors, Global Positioning System (GPS) sensors, magnetic sensors, optical sensors, and ultrasound sensors, for example. The position-and-orientation measuring unit 160 may measure the position and orientation of the information processing apparatus 100 using one measurement device, or may measure the position and orientation of the information processing apparatus 100 using a plurality of measurement devices in conjunction. The position-and-orientation measuring unit 160 may detect landmarks, of which the positions in real space are known, from real space, and detect (calculate) the position and orientation of the information processing apparatus 100 on the basis of detection results of the landmarks. Measurement results of the position and orientation of the information processing apparatus 100 in real space can be reflected in the position and orientation of the user in virtual space.

The information processing apparatus 100 may have a function (mechanism) for correcting the orientation of the information processing apparatus 100 on the basis of the measurement results of the orientation of the information processing apparatus 100 in real space. The information processing apparatus 100 may have a function for estimating at least one of facial orientation (line-of-view direction) and viewpoint (line-of-view position) of the user, on the basis of the measurement results of the orientation of the information processing apparatus 100 in real space. These functions may take into consideration the measurement results of the position of the information processing apparatus 100 in real space.

An analyzing unit 170 analyzes three-dimensional space to be used as a background for a CG, and stores analysis results in the memory 140. For example, the analyzing unit 170 analyzes an image (image data) of real space that is image-captured by the image-capturing unit 110, or an image (image data) of virtual space that is acquired by the data acquisition unit 150. The analyzing unit 170 analyzes at least a partial region of the three-dimensional space. The analyzing unit 170 may analyze just a region that corresponds to the field of view of the user, or may analyze a region including the region that corresponds to the field of view of the user and a region outside of that region (a region not corresponding to the field of view of the user). The region that corresponds to the field of view of the user may be understood as being a region in the direction in which the face of the user is directed, or may be understood as being a region displayed on the display unit 220.

A determining unit 180 determines a display position of a CG on the background (three-dimensional space), on the basis of the settings information of the CG (display conditions) and the analysis results of the background (three-dimensional space).

An operating unit 190 accepts user operations performed on the information processing apparatus 100. The operating unit 190 has operating members such as, for example, switches, dials, a touch panel, and so forth. The operating unit 190 may receive operation signals corresponding to user operations performed using external equipment (e.g., a controller), from the external equipment. The operating unit 190 may have functions of detecting the line of view of the user, so that the user can operate the information processing apparatus 100 by the line of view. The operating unit 190 may have speech recognition functions for recognizing the speech of the user, so that the user can operate the information processing apparatus 100 by speech.

A correcting unit 200 corrects a background image (image of real space or virtual space) stored in the memory 140. The correcting unit 200 can correct at least one of brightness, tint, white balance, resolution, and texture of the background image. An upper limit (correction limit) of correction amount of various types of parameters may be settable, so that the background image is corrected by a correction amount smaller than a predetermined amount (so that the background image is not corrected by a correction amount greater than the predetermined amount).

A compositing unit 210 generates composited images by compositing (combining) CGs with background images (images of real space or virtual space). The CGs are composited at a display position determined by the determining unit 180.

The display unit 220 displays the composited images that are generated by the compositing unit 210. CGs are displayed at a display size specified as display conditions. The display unit 220 is, for example, a thin-film-transistor liquid-crystal display (TFT LCD). The display unit 220 may be a retinal projection display. Successive display of composited images generated by the compositing unit 210 enables the user to experience the real space in which virtual objects are disposed, in real time, for example. In a case of optical see-through, no composited image is generated, and the CGs are displayed at display positions determined by the determining unit 180. The display unit 220 may be used for performing notification to the user.

The information processing apparatus 100 may be a smartphone or a tablet terminal, and the user may look into the display unit 220 with the information processing apparatus 100 in hand. The information processing apparatus 100 may be an HMD, and the user may mount the information processing apparatus 100 on his/her head so as to visually recognize images displayed on the display unit 220. In a case in which the information processing apparatus 100 is an HMD, the information processing apparatus 100 may have two display units, respectively corresponding to the right eye and the left eye, as the display unit 220. The information processing apparatus may have two image-capturing units respectively corresponding to the right eye and the left eye, as the image-capturing unit 110.

First Embodiment

Figure 2:
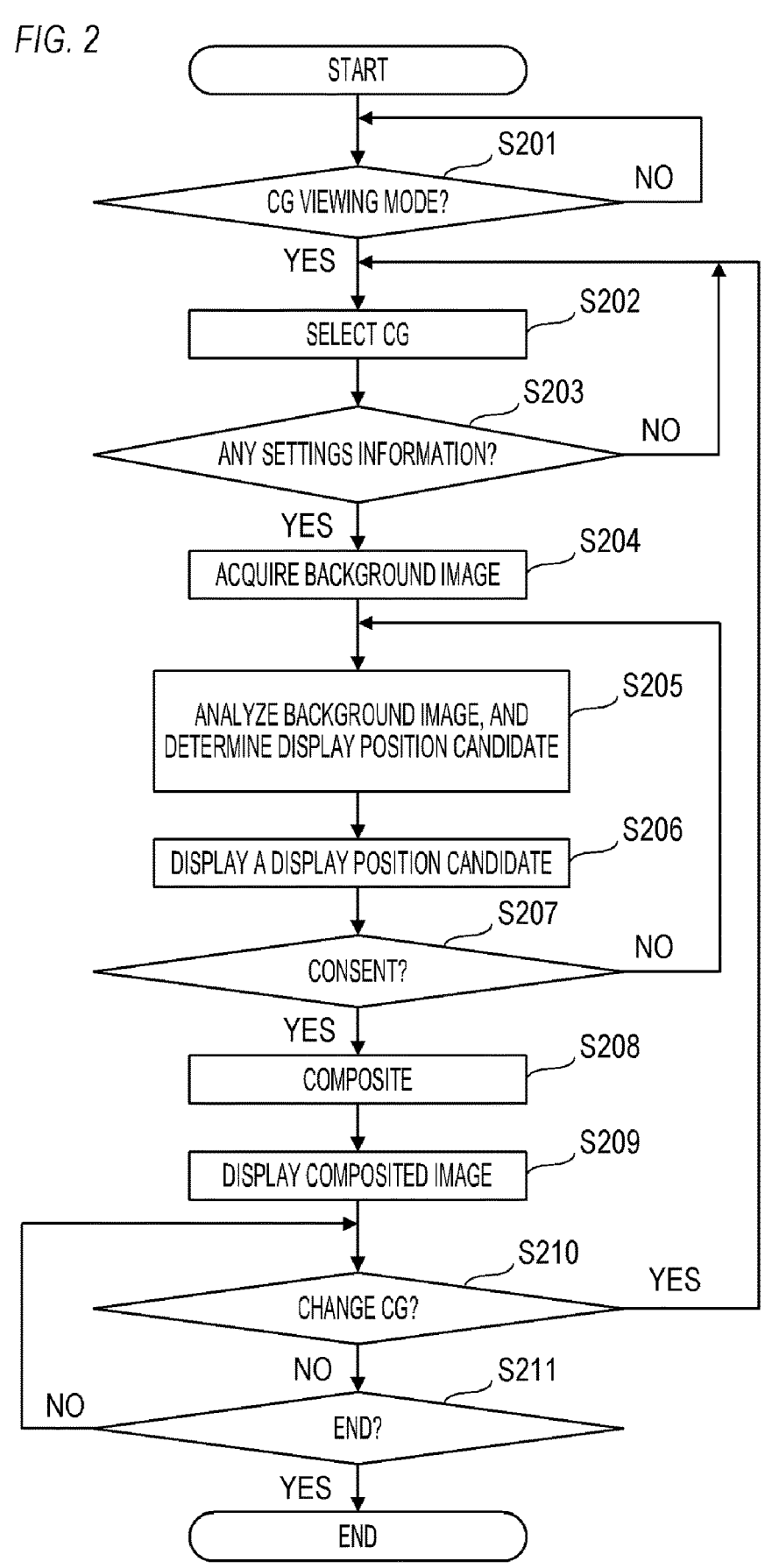
FIG. 2 is a flowchart showing an operation example of a first embodiment.

A first embodiment of the present invention will be described. FIG. 2 is a flowchart showing operations of the system control unit 130.

In step S201, the system control unit 130 determines whether or not an operation mode of the information processing apparatus 100 is set to CG viewing mode. The system control unit 130 repeats step S201 until the operation mode of the information processing apparatus 100 is set to the CG viewing mode, and once the operation mode of the information processing apparatus 100 is set to the CG viewing mode, advances the processing to step S202.

In step S202, the system control unit 130 selects a CG to display from one or more CGs stored in the memory 140. For example, the system control unit 130 selects a CG in accordance with user operations, although the selection method of the CG is not limited in particular. The system control unit 130 then advances the processing to step S203.

In step S203, the system control unit 130 determines whether or not settings information (display conditions) of the CG selected in step S202 was successfully acquired. In a case in which settings information was successfully acquired, the system control unit 130 advances the processing to step S204, and in a case in which settings information was not successfully acquired, advances the processing to step S202. The data acquisition unit 150 may acquire the settings information at the timing of acquiring the CG, and store the CG and the settings information in the memory 140. The data acquisition unit 150 may acquire the settings information and perform storage thereof in the memory 140 after acquiring the CG and performing storage thereof in the memory 140, at the timing of the CG being selected by the system control unit 130. In step S202, all CGs may be selectable, or CGs regarding which settings information is not acquired may be unselectable.

In step S204, the system control unit 130 performs control to acquire a background image (image of real space or virtual space). In a case of using real space as the background, as in AR and MR for example, an image (image data) of real space is acquired by the image-capturing unit 110. The image of real space may be updated in real time, may be updated periodically, or may be updated in accordance with user operations. In a case of using virtual space as the background, as in VR, an image (image data) of virtual space is acquired by the data acquisition unit 150.

In step S205, the system control unit 130 analyzes the background image acquired in step S204, and calculates numerical values of various types of parameters, such as the brightness and tint of the background (background image), using the analyzing unit 170. Subsequently, the system control unit 130 determines candidates (display position candidates) for the display position of the CG in the background image (three-dimensional space), on the basis of the settings information (display conditions) of the CG selected in step S202, and the analysis results of the background image. The determining unit 180 is used to determine the display position candidates. Note that a display position may be determined on the basis of the settings information (display conditions) of the CG and the analysis results of the background image, rather than a display position candidate, and the CG may be displayed at the display position that is determined.

In step S205, a position that matches the display conditions of the CG is determined as the display position of the CG. For example, a position at which difference from a recommendation value (e.g., recommendation value of brightness, recommendation value of tint, recommendation value of white balance, recommendation value of resolution, and recommendation value of texture) acquired as display conditions for the CG is smaller than a threshold value is determined to be a display position candidate for the CG. In a case of using a plurality of types of recommendation values, a threshold value may be set for each type of recommendation value. A position at which the difference from the recommendation value is smaller than the threshold value for all recommendation values (or recommendation values of a number greater than a predetermined number) may be determined to be a display position candidate for the CG. The difference from the recommendation value may be calculated for each type of recommendation value, and a representative value of the plurality of differences that are calculated (e.g., greatest value, smallest value, average value, modal value, or median value) may be compared with one threshold value. A position of which the representative value is smaller than the threshold value may be determined as being a display position candidate for the CG. This is not restrictive, and for example, edges may be detected from the background image, and display position candidates for CG may be determined so as to avoid the edges. Planes of a predetermined orientation (e.g., planes facing the user) may be detected from the background image, and positions on such planes may be determined as being display position candidates for the CG.

Note that in analysis of the background image, just a region that corresponds to the field of view of the user may be analyzed, or a region including the region that corresponds to the field of view of the user and a region outside of that region (a region not corresponding to the field of view of the user) may be analyzed. In a case of using real space as the background, as in AR and MR, a plurality of image-capturing units directed in different directions may be used as the image-capturing unit 110, so as to obtain an image over a broad range, as the image of real space. An image over a broad range may be obtained by the user directing the information processing apparatus 100 in various directions.

In step S206, the system control unit 130 performs control to display the display position candidates determined in step S205 in the three-dimensional space in an identifiable manner (display control). For example, the system control unit 130 uses the compositing unit 210 to composite the CG at the positions of the display position candidates in the background image. The system control unit 130 then performs control to display the composited image that is obtained on the display unit 220. The CG may be displayed at a display size that is specified as a display condition.

In step S207, the system control unit 130 determines whether or not a predetermined user operation (a user operation for determining the display position for the CG) is performed. In a case in which the predetermined user operation is performed, the system control unit 130 determines the display position candidate that is displayed as the display position for the CG, and advances the processing to step S208. In a case in which the predetermined user operation is not performed, the system control unit 130 advances the processing to step S205. In a case in which one display position candidate is displayed, the predetermined user operation is a user operation to instruct consent to determine the display position candidate as the display position for the CG, for example. In a case in which consent is instructed, the display position candidate being displayed is determined to be the display position for the CG, the processing is advanced to step S208, and in a case in which non-consent is instructed, the processing is advanced to step S205. The region corresponding to the field of view of the user (the region displayed on the display unit 220) in the background image may change depending on the position or the orientation of the user (information processing apparatus 100). Also, the background image may change over time. For example, the image of real space may change in accordance with the movement of the sun, or lighting being turned on/off. Accordingly, there are situations in which after the processing advancing to step S205, a different display position candidate is displayed.

Note that in a case in which a plurality of positions at each of which the difference from the recommendation value is smaller than the threshold value are present in the background image (three-dimensional space), the system control unit 130 may determine the position at which the difference from the recommendation value (representative value) is smallest out of the plurality of positions, as the display position candidate for the CG (method 1).

The system control unit 130 may determine a plurality of display position candidates. For example, the system control unit 130 may determine all of the plurality of positions at each of which the difference from the recommendation value is smaller than the threshold value to be display position candidates for the CG. The system control unit 130 may determine a score (degree of priority) for each of the plurality of display position candidates. The system control unit 130 may then perform control to display one display position candidate at a time, in order from the display position candidate of which the score is high, until consent is instructed (until a display position candidate is specified (selected)) (method 2). In a case in which non-consent is instructed for all display position candidates, the processing may be advanced to step S205. The system control unit 130 determines (calculates) the score such that the smaller the difference from the recommendation value is, for example, the greater the score is. A reference height, such as the height of the eyes of the user may be set, with the score being determined such that the farther away from the reference height, the smaller the score is.

The system control unit 130 may perform control to display the plurality of display position candidates on the display unit 220 at one time, and determine the display position candidate that is specified (selected) in response to a user operation specifying (selecting) one of the plurality of display position candidates, as the display position for the CG (method 3). In a case in which no display position candidate is specified (selected), the processing may be advanced to step S205.

The system control unit 130 may determine two or more positions that are part of the plurality of positions at each of which the difference from the recommendation value is smaller than the threshold value to be display position candidates for the CG. For example, the system control unit 130 may determine a score for each of the plurality of positions at each of which the difference from the recommendation value is smaller than the threshold value, and determine a predetermined number of positions, in order from the positions of which the score is high, to be display position candidates for the CG.

In a case in which there are no display position candidates (e.g., positions at each of which the difference from the recommendation value is smaller than the threshold value), the system control unit 130 may perform control to give the user a predetermined notification (notification control). The processing may then be advanced to step S205. The predetermined notification is, for example, notification that no display position candidate was found.

Figure 3:
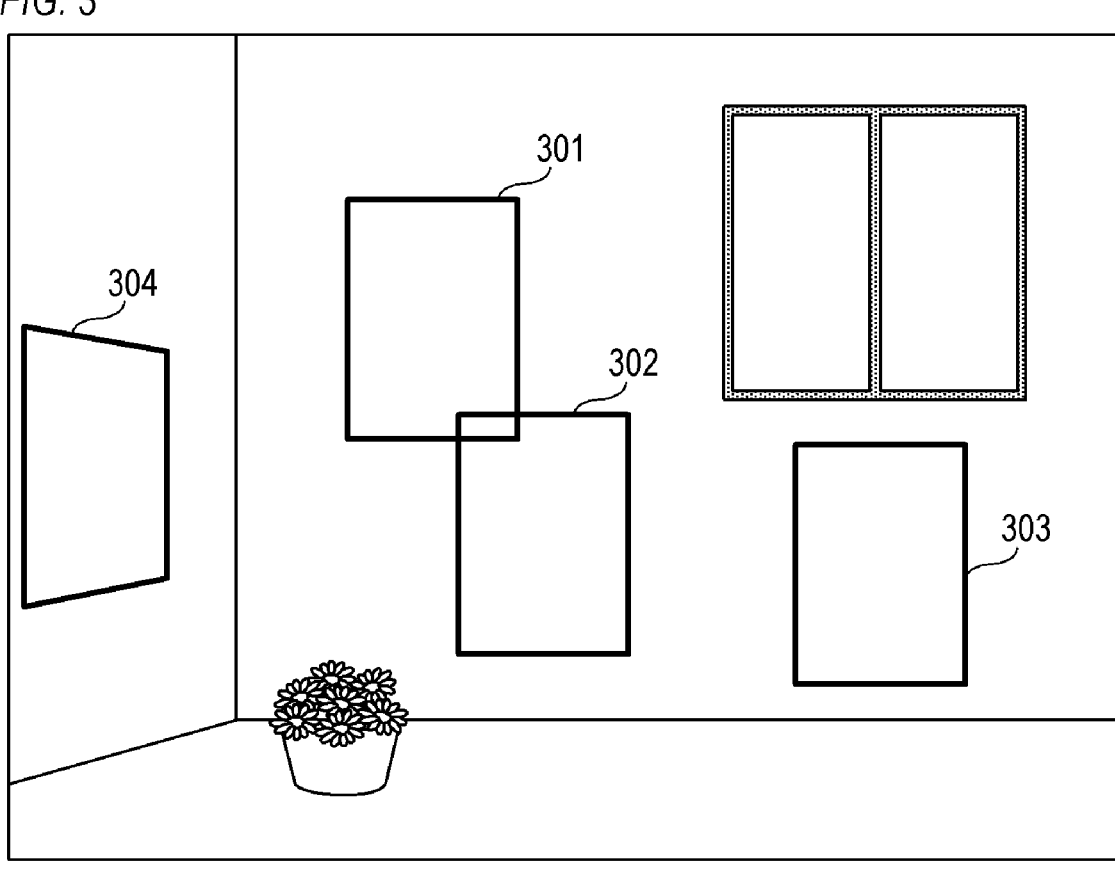
FIG. 3 is a diagram illustrating an example of three-dimensional space.

FIG. 3 illustrates an example of three-dimensional space that the user sees through the display unit 220. In FIG. 3, there are four regions 301, 302, 303, and 304, respectively corresponding to four positions at each of which the difference from the recommendation value is smaller than the threshold value. Assumption will be made that the score (degree of priority) of the region 301 is 100, the score of the region 302 is 85, the score of the region 303 is 80, and the score of the region 304 is 90. In the case of the above-described method 1, for example, only the region 301 of which the score is the highest corresponds to a display position candidate, and the CG is displayed only in the region 301. In the case of the above-described methods 2 and 3, the four regions 301, 302, 303, and 304 correspond to display position candidates. In the case of method 2, the CG is displayed in the region 301, the region 304, the region 302, and the region 303, in that order (unless there is an instruction for consent). In the case of method 3, the CG is displayed in the regions 301, 302, 303, and 304 at the same time. Only regions of a predetermined count from the region of which the score is high may correspond to display position candidates. For example, only the upper three regions 301, 304, and 302 may correspond to display position candidates, and the CG may be displayed in only the regions 301, 304, and 302. Part of the region 301 and part of the region 302 overlap. The score of the region 301 is higher than the score of the region 302, and accordingly the CG displayed in the region 301 may be displayed on the upper side (higher layer) from the CG displayed in the region 302.

In step S208, the system control unit 130 composites the CG selected in step S202 with the background image, using the compositing unit 210. The CG is composited at the display position determined in step S207. The system control unit 130 then advances the processing to step S209.

In step S209, the system control unit 130 controls the composited image generated in step S208 to be displayed on the display unit 220 (display control). For example, the system control unit 130 transmits image data of the composited image to the display unit 220. The system control unit 130 then advances the processing to step S210.

In step S210, the system control unit 130 determines whether or not to change the CG to be displayed. For example, the system control unit 130 determines whether or not a user operation instructing changing of the CG to be displayed has been performed. In a case of changing the CG to be displayed, the system control unit 130 advances the processing to step S202, and in a case of not changing the CG to be displayed, advances the processing to step S211.

In step S211, the system control unit 130 determines whether or not to end the CG viewing mode. For example, the system control unit 130 determines whether or not a user operation instructing ending the CG viewing mode has been performed. In a case of ending the CG viewing mode, the system control unit 130 ends the operations of FIG. 2, and in a case of not ending the CG viewing mode (a case of continuing the CG viewing mode), advances the processing to step S210.

As described above, according to the first embodiment, when viewing a CG in an XR environment, neither the CG nor the background is corrected, and the display position of the CG is decided on the basis of the display conditions of the CG and the analysis results of the background (three-dimensional space). Accordingly, the CG can be displayed at a suitable position for the CG (e.g., a position that satisfies the conditions desired by the creator of the CG), and the CG can be viewed in a state that is in agreement with the intent of the creator of the CG. In the first embodiment, when display conditions differ between a first CG and a second CG, display position candidates that are different from the display position candidates for the second CG may be determined for the display position candidates for the first CG.

Second Embodiment

Figure 4:
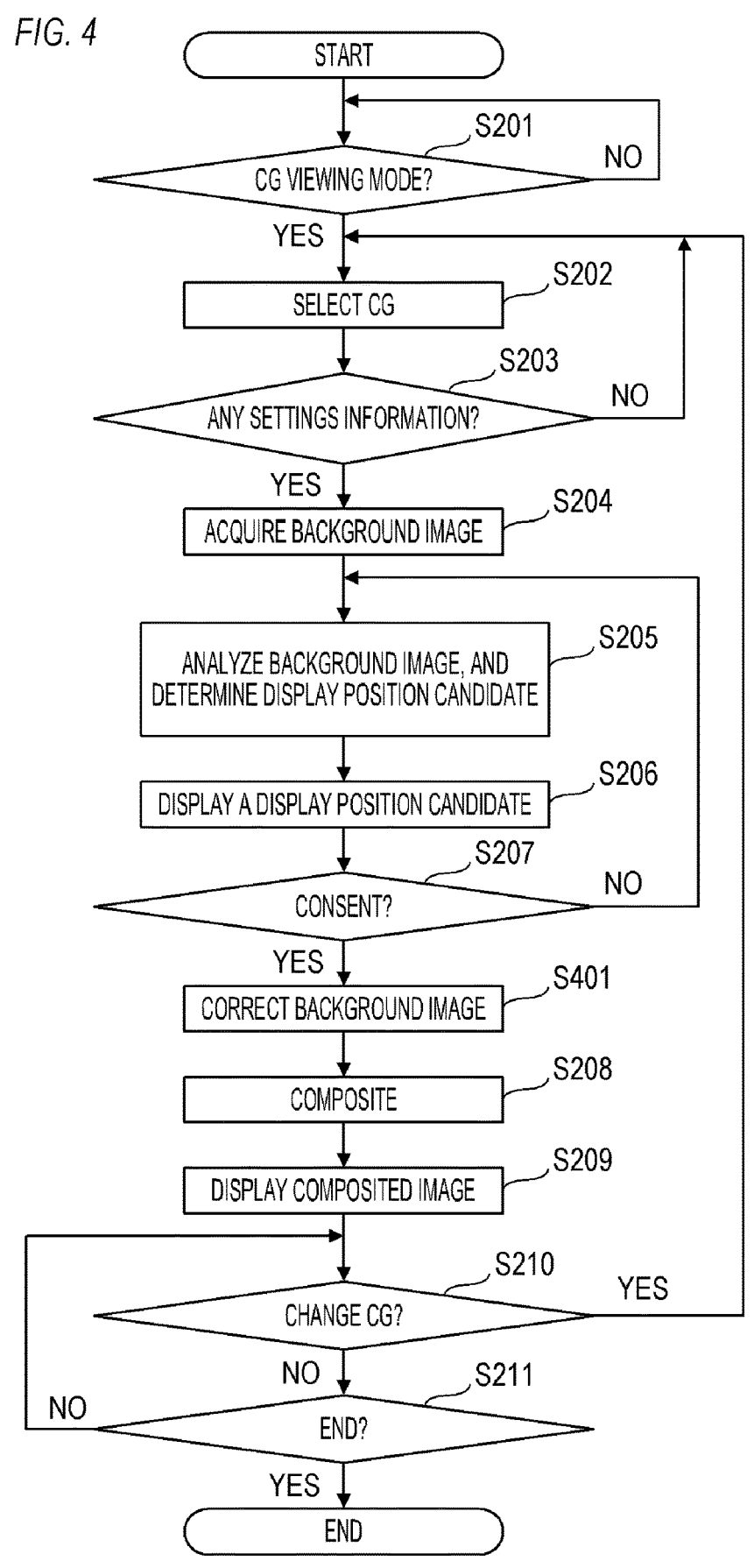
FIG. 4 is a flowchart showing an operation example of a second embodiment.

A second embodiment of the present invention will be described. FIG. 4 is a flowchart showing operations of the system control unit 130. Steps in FIG. 4 that are the same as those in FIG. 2 (first embodiment) are denoted by the same signs as in FIG. 2, and description thereof will be omitted.

Upon determining that a predetermined user operation (a user operation to determine the display position of the CG) is performed in step S207, the system control unit 130 determines a display position candidate that is being displayed as the display position for the CG, and advances the flow to step S401 instead of step S208.

In step S401, the system control unit 130 corrects the background image on the basis of the settings information (display conditions) of the CG selected in step S202, and the analysis results (analysis results of the background image) obtained in step S205. For example, the system control unit 130 corrects the background image such that a parameter (e.g., at least one of brightness, tint, white balance, resolution, and texture) at the display position of the CG draws closer to the recommendation value. The correcting unit 200 is used for correction of the background image. The system control unit 130 then advances the processing to step S208.

When the correction amount of the background image is great, the user may not be able to view the CG with the background that the user desired. An upper limit (correction limit) of the correction amount of various types of parameters may be settable, so that the background image is corrected by a correction amount smaller than a predetermined amount (so that the background image is not corrected by a correction amount greater than the predetermined amount). The correction limit of the various types of parameters may be individually settable for each CG. A plurality of correction limits may be set in advance for one type of parameters, and the user may be able to select one from a plurality of candidates.

As described above, according to the second embodiment, the background image is corrected on the basis of the display conditions of the CG and the analysis results of the background (three-dimensional space), and accordingly, the CG can be viewed in a state that is more in agreement with the intent of the creator of the CG.

Note that while an example in which the background image is always corrected has been described, the background image may be corrected in a case in which there is no display position candidate (e.g., position at which the difference from the recommendation value is smaller than the threshold value) for the CG. The background image may be corrected such that the smallest value of the difference from the recommendation value becomes lower, for example.

Third Embodiment

Figure 5:
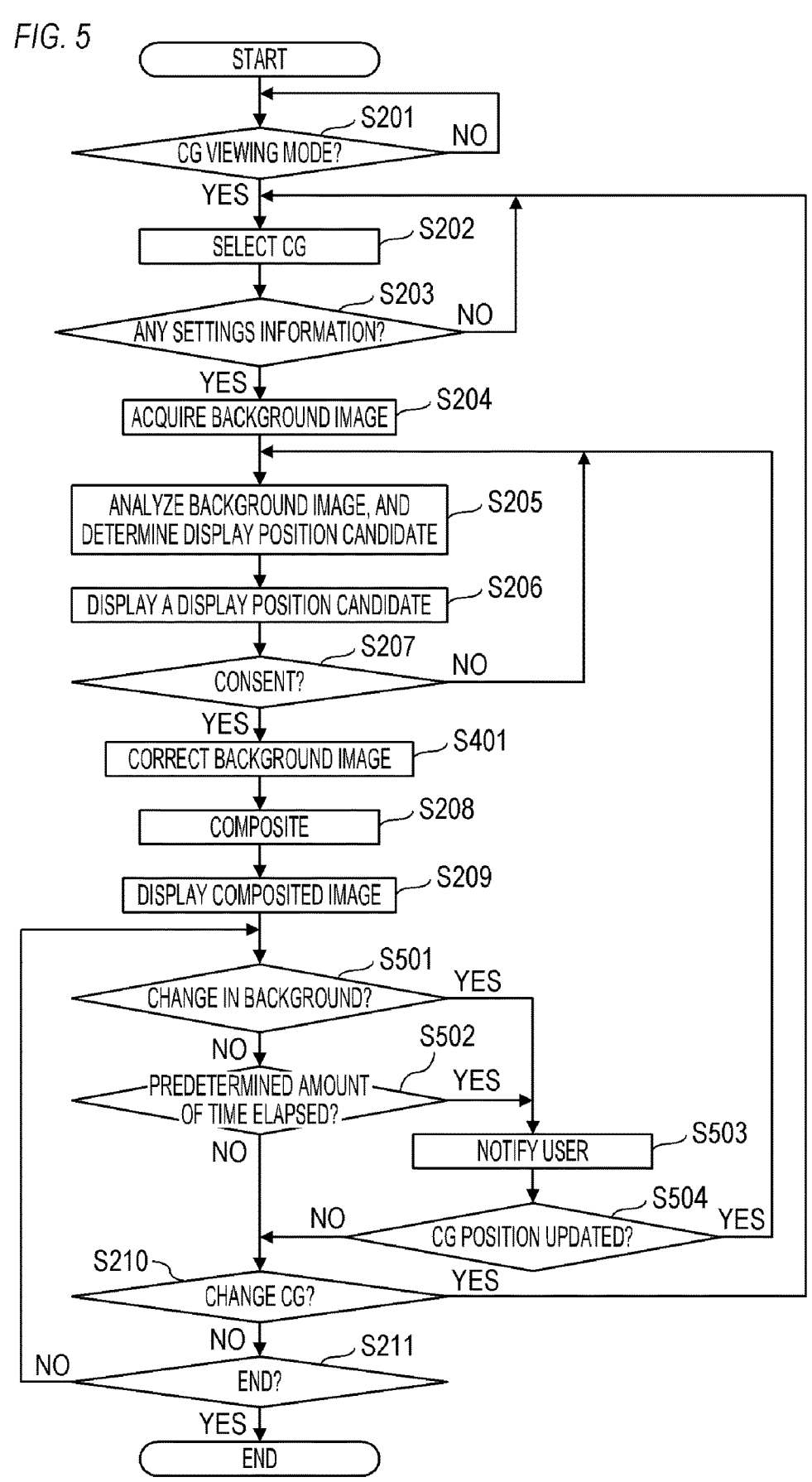
FIG. 5 is a flowchart showing an operation example of a third embodiment.

A third embodiment of the present invention will be described. FIG. 5 is a flowchart showing operations of the system control unit 130. Steps in FIG. 5 that are the same as those in FIG. 4 (second embodiment) are denoted by the same signs as in FIG. 4, and description thereof will be omitted. Following step S209, the system control unit 130 advances the flow to step S501 instead of step S210.

In step S501, the system control unit 130 performs analysis of the background image (three-dimensional space) again, and determines whether or not a predetermined change has occurred in the background image, on the basis of the analysis results of the background image. For example, the system control unit 130 determines whether or not one of the parameters of the background image has changed by a change amount that is greater than a predetermined amount. In a case in which there is a predetermined change in the background image (in a case of a parameter changing by a change amount that is greater than the predetermined amount), the system control unit 130 advances the processing to step S503. In a case in which the predetermined change has not occurred in the background image (in a case of the parameter has not changed by a change amount that is greater than the predetermined amount), the system control unit 130 advances the processing to step S502.

In step S502, the system control unit 130 determines whether or not a predetermined amount of time has elapsed from starting display of the CG. In a case in which the predetermined amount of time has elapsed from starting display of the CG, the system control unit 130 advances the processing to step S503, and in a case in which the predetermined amount of time has not elapsed from starting display of the CG, advances the processing to step S210.

In step S503, the system control unit 130 performs control to give the user a predetermined notification (notification control). The system control unit 130 then advances the processing to step S504. The predetermined notification is, for example, a notification prompting updating of the display position of the CG. In a case of the processing advancing from step S501 to step S503, notification may be made that there has been change in the background image (that a parameter of the background image changed by a change amount that is greater than the predetermined amount). In a case of the processing advancing from step S502 to step S503, notification may be made that the predetermined amount of time has elapsed from starting display of the CG.

In step S504, the system control unit 130 determines whether or not a user operation, instructing updating of the display position of the CG, has been performed. In a case in which a user operation instructing updating of the display position of the CG has been performed, the system control unit 130 advances the processing to step S205, and in a case in which no user operation instructing updating of the display position of the CG has been performed, advances the processing to step S210.

The background image may change over time, and the display position of the CG may no longer be in agreement with the display conditions (the viewing state of the CG is a state deviated from the intent of the creator of the CG) due to the background image changing over time. For example, the image of real space may change in accordance with the movement of the sun, or lighting being turned on/off. According to the third embodiment, in a case in which the viewing state of the CG is a state deviated from the intent of the creator of the CG due to the background image changing over time, the user can be prompted to update the display position of the CG. Thus, the display position of the CG can be updated, and the viewing state of the CG can be returned to a state more in agreement with the intent of the creator of the CG.

According to the present invention, the CG can be viewed in a state in agreement with the intent of the creator of the CG.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-013757, filed on Feb. 1, 2023, which is hereby incorporated by reference herein in its entirety.

What is claimed is:

1. An information processing apparatus comprising:
at least one memory and at least one processor which function as:
(1) an acquisition unit configured to acquire a display condition for a graphic to be displayed in three-dimensional space;
(2) an analyzing unit configured to analyze the three-dimensional space; and
(3) a determining unit configured to determine a display position of the graphic in the three-dimensional space, on a basis of (a) the display condition and (b) an analysis result of the three-dimensional space,
wherein the display condition is associated with the graphic, and includes a condition relating to the three-dimensional space, and
wherein the acquisition unit acquires, as the display condition, one or more recommendation values that include at least one of a recommendation value of brightness of a background, a recommendation value of tint of the background, a recommendation value of white balance of the background, a recommendation value of resolution of the background, and a recommendation value of texture of the background.

2. The information processing apparatus according to claim 1, wherein the at least one memory and the at least one processor further function as a second acquisition unit configured to acquire image data of the three-dimensional space, and
wherein the analyzing unit analyzes the image data of the three-dimensional space.

3. The information processing apparatus according to claim 1, wherein the at least one memory and the at least one processor further function as a display control unit configured to perform control to display the graphic at the display position in the three-dimensional space.

4. The information processing apparatus according to claim 1, wherein the three-dimensional space is real space or virtual space.

5. The information processing apparatus according to claim 1, wherein the analyzing unit analyzes at least a partial region of the three-dimensional space, and
wherein the region analyzed by the analyzing unit is (1) a region that corresponds to a field of view of a user, or (2) a region including (a) the region that corresponds to the field of view and (b) a region that does not correspond to the field of view.

6. The information processing apparatus according to claim 1, wherein the acquisition unit acquires, as the display condition, metadata added to image data of the graphic, data that is separate from the image data of the graphic, data stored in the information processing apparatus, or data stored in an external device.

7. The information processing apparatus according to claim 1, wherein the determining unit determines a candidate for the display position of the graphic in the three-dimensional space, on a basis of (1) the display condition and (2) the analysis result of the three-dimensional space,
wherein the candidate is displayed identifiably in the three-dimensional space, and
wherein the determining unit determines, in response to a predetermined user operation during display of the candidate, the candidate to be the display position of the graphic.

8. The information processing apparatus according to claim 7, wherein the determining unit determines a position in the three-dimensional space at which a difference from the one or more recommendation values acquired as the display condition is smaller than a threshold value, as the candidate for the display position of the graphic.

9. The information processing apparatus according to claim 8, wherein, in a case in which a plurality of positions at each of which the difference from the one or more recommendation values acquired as the display condition is smaller than the threshold value exist in the three-dimensional space, the determining unit determines a position at which the difference is smallest among the plurality of positions, as the candidate for the display position of the graphic.

10. The information processing apparatus according to claim 1, wherein the graphic is a graphic to be displayed in a state where it is combined on an image of the three-dimensional space, and
wherein the at least one memory and the at least one processor further function as a correcting unit configured to correct an image of the three-dimensional space on a basis of (1) the display condition and (2) the analysis result of the three-dimensional space.

11. The information processing apparatus according to claim 10, wherein the correcting unit corrects at least one of brightness, tint, white balance, resolution, and texture of the image of the three-dimensional space.

12. An information processing method comprising:
acquiring a display condition for a graphic to be displayed in three-dimensional space;
analyzing the three-dimensional space; and
determining a display position of the graphic in the three-dimensional space, on a basis of (a) the display condition and (b) an analysis result of the three-dimensional space,
wherein the display condition is associated with the graphic, and includes a condition relating to the three-dimensional space, and
wherein the acquiring acquires, as the display condition, one or more recommendation values that include at least one of a recommendation value of brightness of a background, a recommendation value of tint of the background, a recommendation value of white balance of the background, a recommendation value of resolution of the background, and a recommendation value of texture of the background.

13. A non-transitory computer-readable medium that stores a program, wherein the program causes a computer to execute an information processing method comprising:
acquiring a display condition for a graphic to be displayed in three-dimensional space;
analyzing the three-dimensional space; and
determining a display position of the graphic in the three-dimensional space, on a basis of (a) the display condition and (b) an analysis result of the three-dimensional space,
wherein the display condition is associated with the graphic, and includes a condition relating to the three-dimensional space, and
wherein the acquiring acquires, as the display condition, one or more recommendation values that include at least one of a recommendation value of brightness of a background, a recommendation value of tint of the background, a recommendation value of white balance of the background, a recommendation value of resolution of the background, and a recommendation value of texture of the background.

* * * * *